United States Patent Office 3,322,734
Patented May 30, 1967

3,322,734
IONICALLY LINKED COPOLYMERS
Richard Watkin Rees, Graylyn Crest, Del., assignor to E. I. du Pont de Nemours and Company, Wilmington, Del., a corporation of Delaware
No Drawing. Filed May 19, 1965, Ser. No. 457,164
10 Claims. (Cl. 260—79.3)

This application is a continuation-in-part of copending application Ser. No. 239,820, filed Nov. 23, 1962, which in turn, in a continuation-in-part of application Ser. No. 220,859, filed Aug. 31, 1962, both now abandoned.

The present invention relates to novel ionically linked copolymers.

It is an object of this invention to increase the tensile strength, modulus, and hardness of various hereinafter-described polymers.

These and other objects are accomplished by attaching acid groups to the polymer and then neutralizing the ionized carboxyls or ionized sulfonyls with metal ions to ionically link the polymer. The acid groups may be attached to the polymer in a variety of ways. One way is by copolymerizing a portion of an $\alpha,\beta$-ethylenically unsaturated carboxylic acid monomer with the predominant monomer, or by graft polymerizing an $\alpha,\beta$-ethylenically unsaturated carboxylic acid monomer on the predominant polymer, or by grafting acid groups on the predominant polymer, e.g., sulfonating polystyrene.

The metal ions are supplied to the polymer by milling, melt blending, or slurring the polymer with a salt of the metal which is to ionically link the polymer.

The polymers useful in the present invention are addition polymers, and contain from 0.2 to 25 mole percent, based on the monomer units in the polymer, of acid groups. When using copolymerized and graft polymerized acid group containing monomers, the $\alpha,\beta$-unsaturated carboxylic acids are those containing from 3 to 10 carbon atoms. Examples of such monomers are acrylic acid, methacrylic acid, ethacrylic acid, itaconic acid, maleic acid, fumaric acid, monoesters of the above dicarboxylic acids, such as methyl hydrogen maleate, methyl hydrogen fumarate, ethyl hydrogen fumarate, and maleic anhydride, mononitriles of the above dicarboxylic acids such as $\beta$-cyano acrylic acid and monoamides of the above dicarboxylic acids such as fumaric monoamide. In general, it is preferred that the alcohol or amine forming the respective ester or amide, be an alkyl alcohol or amine which alkyl group contains up to 10 carbon atoms. As indicated, the polymer contains from 0.2 to 25 mole percent of the carboxylic acid monomer but preferably contains from 1 to 10 mole percent of the carboxylic acid monomer. The remainder of the copolymer or the original polymer on which the carboxylic acid group containing monomers are grafted consists essentially of vinyl monomeric units which have the structure $CH_2=CHR_1$, wherein $R_1$ is selected from the group consisting of aromatic radicals, ester radicals, amide radicals, acyloxy radicals, alkoxy radicals, halogens, acyl radicals, and nitriles, or monomeric units having the structure

wherein $R_2$ is selected from the group consisting of halogens, and methyl, and $R_3$ is selected from the group consisting of halogens, the phenyl radical, ester radicals, amide radicals and nitriles. The copolymers, in general, are most readily obtained by graft polymerization of the acid monomer to a polymer base of the major comonomer. Such graft copolymers are generally obtained by exposing a solution or finely divided powder of a polymer of the major comonomer to ionizing radiation in the presence of the carboxylic acid monomer. In another method, the polymer of the major comonomer in solution or finely divided form is contacted with a solution of the acid and a peroxide. Graft polymerization has been described in great detail in the literature and is for that reason not further detailed here. Copolymers of the major constituent monomer with carboxylic acids may also be prepared by copolymerization of the major constituent monomer with an $\alpha,\beta$-ethylenically unsaturated carboxylic acid derivative which subsequently or during copolymerization is reached either completely or in part to form the free acid. Thus, hydrolysis, saponification or pyrolysis may be employed to form an acid copolymer from an ester copolymer.

Other polymers useful in the present invention include polymers on which acid groups have been attached. Examples of such polymers include partially sulfonated polystyrene and partially carboxylated polystyrene. Similar polymers are produced by copolymerizing or graft polymerizing styrene with styrene sulfonic acid or styrene carboxylic acid. The styrene sulfonic acid/styrene copolymers contain from 0.2 to 25 mole percent and preferably from 1 to 10 mole percent acid groups, based on the monomer units in the polymer, the same as the $\alpha,\beta$-ethylenically unsaturated carboxylic acid copolymers.

The copolymers employed to form ionic copolymers which are useful as palstics are preferably of high molecular weight in order to achieve the outstanding solid state properties which can be otbained through the use of this invention. Although the mechanical properties of low molecular weight copolymers are improved by the process of the present invention, the resulting product does ont exhibit such mechanical properties as are obtained when using high molecular weight copolymers. The molecular weight of the copolymers useful in the present invention is most suitably defined by inherent viscosity. The inherent viscosity of copolymers employed in the formation of ionic copolymers which are useful as plastics is preferably above 0.7 as determined from a 0.5 percent solution of the polymer in dimethylformamide at 20° C.

The copolymer base resins used need not necessarily comprise a two-component copolymer. Thus, more than one of the major constituent comonomers above-described may be used.

The scope of the copolymers suitable for use as the copolymer in the present invention is illustrated by the following examples: methylmethacrylate/methacrylic acid copolymers, styrene/acrylic acid copolymers, vinylidene chloride/acrylic acid copolymers, vinyl acetate/itaconic acid copolymers, N-butyl acrylamide/acrylic acid copolymers, methyl vinyl ether/fumaric acid copolymers, acrylonitrile/acrylic acid copolymers, vinyl chloride/methyl hydrogen itaconate copolymers, 1-methyl styrene/methacrylic acid graft copolymers, ethyl methacrylate/methacrylic acid copolymers, methacrylamide/methacrylic acid copolymers, methacrylonitrile/methacrylic acid copolymers, styrene/p-styrene sulfonic acid copolymers, and styrene/p-styrene carboxylic acid copolymers.

The ionizable metal compounds reaction with the copolymer is herein referred to as "neutralization." The reaction mechanism involved in the ionic linking of the copolymers is at the present time not completely understood. However, a comparison of the infrared spectrum of the copolymer starting material with that of the ionic copolymer shows the appearance of an absorption band at about 6.4 microns, when using carboxylic acid groups, which is characteristic of the ionized carboxyl group, —COO⁻, a decrease in the crystallinity band at 13.7 microns and a substantial decrease, depending on the degree of neutralization of a band at 10.6 microns, characteristic of the unionized carboxyl group, —COOH. It is consequently deduced that the surprising properties of ionic copolymer blends are the result of an ionic attraction between the metal ion and one or more acid groups.

This ionic attraction results in a form of ionic linking which takes place in the solid state. However, when molten and subjected to shear stresses which occur during melt fabrication, the ionic links of these polymers are ruptured and the polymers exhibit melt flow characteristics essentially the same as the average of the base linear copolymer. On cooling of the melt and the absence of shear stress occurring during fabrication, the ionic links, because of their ionic nature, are reformed and the solidified copolymer again exhibits the properties of an ionically linked polymer.

The change in properties resulting from neutralization or ionic linking of the base copolymer to the ionic copolymer is proportional to the degree of ionic linking and, therefore, the number of ionic links and the nature of the ionic link involved. Although an improvement in solid state properties is obtained with even a small percentage of the acid groups neutralized, in general, a noticeable improvement is observed only after the ionic linking agent equals 0.2 mole percent of the polymer and at least 10 percent of the acid groups are neutralized. However, the maximum benefit from ionic linking is attained when there are sufficient ionic links to form an infinite network. This, of course, not only depends on the degree of neutralization, but also on the number of ionic linking sites, and the molecular weight of the base copolymer. In general, it was found that base copolymers having an average acid group concentration of 1 to 10 mole percent show the best properties upon 30 to 80 percent neutralization. In general, no substantial further improvement in solid state properties is observed if the neutralization is continued beyond the point at which an infinite network of ionically linked copolymer chains is formed. However, the shear stress necessary to break the metal ion ionic links, and, thus make the copolymer melt fabricable, is steadily increased with an increasing number of ionic links. Thus, the maximum neutralization should not exceed about 90 percent of the total acid groups present.

Metal ions which are suitable in forming the ionic copolymers of the present invention can be divided into two categories, uncomplexed or free metal ions and complexed metal ions. In the uncomplexed metal ions, the valence of the ion corresponds to the valence of the metal. These metal ions are obtained from the commonly known and used metal salts. The complexed metal ions are those in which the metal is bonded to more than one type of salt group, at least one of which is ionized and at least one of which is not. Since the formation of the ionic copolymers requires only one ionized valence state, it will be apparent that such complexed metal ions are equally well suited in the present invention. The term "metal ion having one or two ionized valence states" means a metal ion having the general formula $Me^{+n}X_m$, where $n$ is the ionic charge and is at least 1, X is a non-ionized group and $n+m$ is at least 1. The utility of a complexed metal ion employed in the formation of ionic copolymers corresponds to an uncomplexed metal ion having the same effective ionized valence. For example, a trivalent metal with two groups attached behaves as a monovalent ion in these ionic polymers. Thus, higher valent metals may be included depending on how many metal valences are complexed and how many can be ionized. The preferred complexed metal ions are those in which all but one metal valences are complexed and one is readily ionized. Such compounds are in particular, the mixed salts of very weak acids, such as fatty acids, with ionizable acids such as formic and acetic acid. The suitable uncomplexed metal ions for use in this invention are those which have a valence of one or two. In particular, the mono- and divalent ions of metals in Groups I-A, I-B, II-A, II-B, IV-A and VIII of the Periodic Table of Elements (see page 392, Handbook of Chemistry and Physics, Chemical Rubber Publishing Co., 37th Edition) are suitable ionic linking metal ions. Suitable metal ions include $Na^+$, $K^+$, $Li^+$, $Cs^+$, $Ag^+$, $Hg^+$, $Cu^+$, $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$, and $Zn^{+2}$. The alkali metals are preferred because they result in ionic copolymers having the best combination of improvement in solid state properties along with retention of melt fabricability. This is particularly true when a dicarboxylic acid is used in forming the copolymer. It is not essential that only one metal ion be employed in ionically linking the copolymer, and more than one metal ion may be preferred in some instances.

The quantity of ionic linking agents employed or the degree of neutralization of the acid groups in the copolymer will differ with the degree of solid property change, and degree of melt property change. In general, it was found that the concentration of the ionic linking agent should be sufficient to react with or neutralize at least 10 percent of the acid groups in order to obtain a significant improvement in the solid state properties of the copolymer. As explained above, the degree of neutralization for optimum properties will vary with the acid concentration and the molecular weight of the copolymer. However, it is generally desirable to neutralize at least 30 percent of the acid groups. The degree of neutralization may be measured by several techniques. Thus, infrared analysis may be employed and the degree of neutralization calculated from the changes resulting in the absorption bands. Another method comprises the titration of a solution of the cross linked copolymer with a strong base. In general, it was found that the added metal ion reacts stoichiometrically with the acid groups in the copolymer up to 90 percent neutralizations. Small excess quantities of the ionic linking agent are necessary to carry the neutralization to completion. Large excess quantities of ionic linking agent are to be avoided since they do not improve the properties of the copolymer and, on the contrary, may have a detrimental effect on said copolymer.

The cross-linking of the copolymer is carried out by the addition of a metal compound to the copolymer. It is, furthermore, essential in order to achieve the ionic link that the ionic linking compound be water-soluble. A compound is considered water-soluble for the purposes of the present invention if it is soluble in water at room temperature to the extent of two weight per cent. This requirement is explained as separating those ionic compounds which are capable of exchanging a metal ion for the hydrogen ion of the acid group in the copolymer from those which do not interact with the acid group. The third requirement for the metal compound employed to give rise to the ionic link is that the salt radical reacting with the hydrogen of the acid group must form a compound which is removable from the copolymer at reaction conditions as by differential solubility, volatilization, etc. This requirements is essential to obtain the acid groups in the copolymer in ionic form and, furthermore, to remove the salt radical from the copolymer so that the attraction between the ionized acid groups of the copolymer and the metal ion is not overshadowed by the attraction between the metal ion and its original salt radical. Although the foregoing limits delineate metal compounds suitable in forming metal ions in the acid copolymers which result in ionic links, certain types of compounds are preferred because of their ready availability and ease of reaction. Preferred metal salts include formates, acetates, hydroxides of sufficient solubility, methoxides, ethoxides, carbonates, and bicarbonates. Metal compounds which are generally not suitable in resulting in ionic cross links include, in particular, metal oxides, because of their lack of solubility, metal salts of fatty acids which form residues which are difficult to separate from the copolymer, and certain metal organic compounds which lack the necessary ionic character.

The ionic linking reaction is carried out under conditions which allow for a homogeneous distribution of the ionic linking agent in the copolymer. No particular reaction conditions are essential except that the conditions should permit removal of the hydrogen-salt radical reaction product of the ionic linking agent. Since the homogeneous distribution of the ionic linking agent and the necessary removal of the hydrogen salt radical is difficult at room temperature, elevated temperatures are generally employed. More specifically, the ionic linking reaction is carried out by melt blending the copolymer with the cross-linking compound, which preferably is employed in solution, or by adding the ionic linking agent, directly or in solution, to a solution of the copolymer and then, on reaction, precipitating and separating the resulting ionically linked blend. Of these techniques, the first is greatly preferred because of its relative simplicity. It is to be understood, however, that the specific technique employed is not critical as long as it meets the general requirements set forth above.

The following examples further illustrate the methods employed in forming the ionically linked copolymers of the present invention.

Example I

A mixture, consisting of 100 cc. styrene (09.74 g.), 5 cc. methacrylic acid, (5.08 g.), 125 cc. benzene, and 0.15 gram benzoyl peroxide, was refluxed for 11 hours under a nitrogen blanket. One hundred and fifty grams of the resulting copolymer solution was treated with a solution of 2 grams of sodium methoxide in 5 cc. of methanol to ionically link the copolymer. The copolymer actually contains 3.185 g. of methacrylic acid, which when reacted with the 2 g. of sodium methoxide gives a degree of ionization of 62.7%. The viscosity increased, and the benzene was removed by by evaporation. The polymeric product was ground up, washed with water and dried. The infrared spectrum showed peaks at 6.2 to 6.5 micons characterictic of ionized carboxyl groups. From the remaining solution, the free acid was isolated by evaporation. The tensile properties hereinafter reported in this and the following examples were obtained by the stretching of a 60 mil sample at 0.2 inch/minute. The stiffness values hereinafter reported were obtained by the Tinius Olsen Method ASTM D–747–50.

| Sample | Yield Strength (p.s.i.) | Ultimate Tensile Strength (p.s.i.) | Elongation (percent) | Stiffness (p.s.i.) |
| --- | --- | --- | --- | --- |
| Free acid | 1,250 | 1,250 | 6 | 360,000 |
| Sodium salt | 1,440 | 1,440 | 10 | 470,000 |

Example II

A mixture, consisting of 200 cc. water, 100 cc. styrene, 2 grams sodium styrene sulfonate, 1 gram of tetrasodium-N-(1,2-dicarboxyl)-N-octadecyl sulfosuccinamate, and 0.2 gram of potassium persulfate, was stirred under reflux for 5 hours. The product was a stable latex, from which the polymer was recovered by evaporation, followed by chopping up and washing with water. The entire product was converted to the free acid by dissolving in benzene and treatment with methanolic HCl. Twenty-five grams of this free acid product was dissolved in 250 cc. of benzene at 70° C. and one gram of sodium methoxide dissolved in 5 cc. of methanol was added. The product was recovered by evaporation of the benzene followed by washing with methanol. The product was 86% ionized.

| Sample | Stiffness (p.s.i.) | Ultimate Tensile Strength (p.s.i.) | Elongation (percent) |
| --- | --- | --- | --- |
| Free acid | 406,000 | 4,175 | 7.3 |
| Sodium salt | 417,000 | 5,230 | 6.5 |

Examples III–XII

In Table I, the copolymers were prepared by graft polymerization of the acid monomer onto a polymer of the vinyl monomer. The experiments were performed using the same general procedures outlined in the foregoing Example. Property data are summarized in the table. They illustrate the improved tensile properties achieved by ionic cross linking of the copolymers. In each of Examples III to XII, the crosslinking agent was added in an amount stoichiometrically equivalent to the

TABLE I

| Example | Copolymer | Properties of Base Uncross-Linked Copolymer | | | Cross-Linking Agent | Actual Percent of Acid Groups Neutralized | Properties of Ionically Linked Copolymer | | |
| --- | --- | --- | --- | --- | --- | --- | --- | --- | --- |
| | | Stiffness | Yield | Elongation | | | Stiffness | Yield | Elongation |
| 3 | Styrene/maleic acid 90/10 | 280,000 | 4,900 | 4 | Magnesium acetate | 82 | 320,000 | 6,300 | 5 |
| 4 | Vinyl chloride/acrylic acid 92/8 | 405,000 | 3,300 | 3.5 | Strontium hydroxide | 77 | 605,000 | 5,200 | 6 |
| 5 | Acrylonitrile/acrylic acid 90/10 | 436,000 | 51,000 | 4.3 | Lithium hydroxide | 73 | 595,000 | 6,400 | 8 |
| 6 | Vinyl chloride/methacrylic acid 90/10 | 428,000 | 3,700 | 5.5 | Zinc acetate | 68 | 580,000 | 4,800 | 10 |
| 7 | Methyl methacrylate/methacrylic acid 90/10 | 420,000 | 4,350 | 3.5 | Sodium methylate | 74 | 560,000 | 6,100 | 6 |
| 8 | Styrene/methacrylic acid 90/10 | 340,000 | 4,960 | 2.8 | Zinc acetate | 79 | 520,000 | 5,500 | 4 |
| 9 | Methyl acrylate/methacrylic acid 90/10 | 26,300 | 1,430 | 230 | Sodium hydroxide | 83 | 48,000 | 1,800 | 200 |
| 10 | Vinyl acetate/methacrylic acid 90/10 | 410,000 | 3,800 | 8 | Strontium hydroxide | 70 | 490,000 | 5,200 | 7 |
| 11 | Vinyl chloride/acrylic acid 42/8 | 405,000 | 3,300 | 3.5 | Lithium hydroxide | 80 | 570,000 | 4,800 | 4.0 |
| 12 | Styrene/acrylonitrile/acrylic acid 40/50/10 | 510,000 | 5,800 | 5.3 | Lithium hydroxide | 76 | 615,000 | 6,800 | 6.3 | acid groups in the copolymer. However, the linking agent actually reacts to produce the degree of linking indicated.

The ionically linked copolymers of the present invention exhibit surprising rheological properties. Thus, although having extremely low melt indices as determined by ASTM D–1238–52 which would indicate that the ionic copolymers are not melt fabricable, the opposite is true in that these copolymers can be melt extruded, injection molded, and compression molded with ease. This is explained, of course, by the difference in shear stress exerted on the melt in a melt indexer and in extruder, for example. At low shear stresses in the melt indexer, the high melt strength of the ionically linked copolymer results in low melt flow. However, once this is overcome by a higher shear stress, the metal ion ionically linked copolymers flow readily. The combination of high melt strength at low shear stresses and good melt flow at high shear stresses is highly desirable in all applications requiring forming of the melt subsequent to extrusion, such as in bottle blowing in which an extruded parison is blown into a bottle, and in thermoforming in which molten sheet is forced against a mold by means of a vacuum. In both these fabrication techniques, the melt blend becomes unsupported during some part of the fabrication cycle and it is, therefore, highly desirable that the copolymer melt has a high melt strength and good retention of shape. Similarly, the ionically linked copolymers of the present invention are extremely useful for the preparation of foams in that they overcome the difficulty from the low strength of the foamed, but not yet solidified, polymer which has been a major problem in foam extrusion, and which frequently has caused the collapse of the foam. It is even more surprising that both mono- and divalent metal ions can be used to obtain these advantages.

An additional advantage that can be obtained in the blends of the present invention is coloration. By proper choice of metal ions and combinations of metal ions, many colors can be produced in the ionically linked copolymers. This method of coloration has advantages over polymer dyeing in that the dyes have a tendency to exude from many polymers and frequently are not compatible therewith. It also has an advantage over coloration by pigmentation in that the coloration is more uniform and even, particularly in light colors. Furthermore, colored compositions can be made transparent.

The ironically linked copolymers of this invention may be modified, if desired, by the addition of antioxidants, stabilizers, fillers, and other additives employed in the art for the base polymer. It is generally preferred to employ additives which do not interfere with the cross linking agent. Generally, however, additives do not interfere with the ionic linking compounds used in this invention.

The high molecular weight ionically linked copolymers of the present invention can be extruded into films of excellent clarity, fibers of outstanding tensile strength, pipes, wire coatings and foamed sheets; they further can be injection molded into intricate shapes and closely retain the dimension of the mold; they can be vacuum formed, blow molded and compression molded with relative ease. Surfaces of these ionically linked copolymers are printable and adhere well to adhesives commercially available. Thus, they can be laminated to paper, metal foil, and other plastic surfaces. The adhesion properties of these ionically linked copolymers are so good that they themselves can be employed as adhesives. Low molecular weight ionic copolymers particularly are useful for such purposes.

What is claimed is:

1. A thermoplastic addition copolymer consisting essentially of monomer units selected from the group of monomer units having the structure $CH_2=CHR_1$, wherein $R_1$ is selected from the group consisting of aromatic radicals, ester radicals, amide radicals, acyloxy radicals, alkoxy radicals, halogens, acyl radicals, nitriles, and mono units having the structure

wherein $R_2$ is selected from the group consisting of halogens, and methyl, and $R_3$ is selected from the group consisting of halogens, the phenyl radical, ester radicals, amide radicals, and nitriles, and from 0.2 to 25 mole percent of an acid group containing monomer, from 10 to 90 percent of which acid groups are neutralized with metal ions having an ionized valence state of 1 as an ionic linking agent.

2. The composition of claim 1 wherein the metal ions are alkali metal ions.

3. The composition of claim 2 wherein the acid group containing monomer comprises from 1 to 10 mole percent of the copolymer and from 30 to 80 percent of the acid groups are neutralized.

4. The composition of claim 3 wherein the acid group containing monomer is styrene sulfonic acid.

5. The composition of claim 3 wherein the acid group containing monomer is styrene carboxylic acid.

6. The composition of claim 3 wherein the acid group containing monomer is an $\alpha,\beta$-ethylenically unsaturated carboxylic acid containing from 3 to 10 carbon atoms.

7. The composition of claim 4 wherein at least 50 mole percent of the monomer units in the polymer are styrene.

8. The composition of claim 5 wherein at least 50 mole percent of the monomer units in the polymer are styrene.

9. The composition of claim 6 wherein at least 50 mole percent of the monomer units in the polymer are styrene.

10. The composition of claim 6 wherein at least 50 mole percent of the monomer units in the polymer are methyl methacrylate.

References Cited
UNITED STATES PATENTS 2,754,280    7/1956    Brown et al. _____ 260—78.5

JOSEPH L. SCHOFER, *Primary Examiner.*

D. K. DENENBERG, *Assistant Examiner.*